United States Patent Office 3,256,218
Patented June 14, 1966

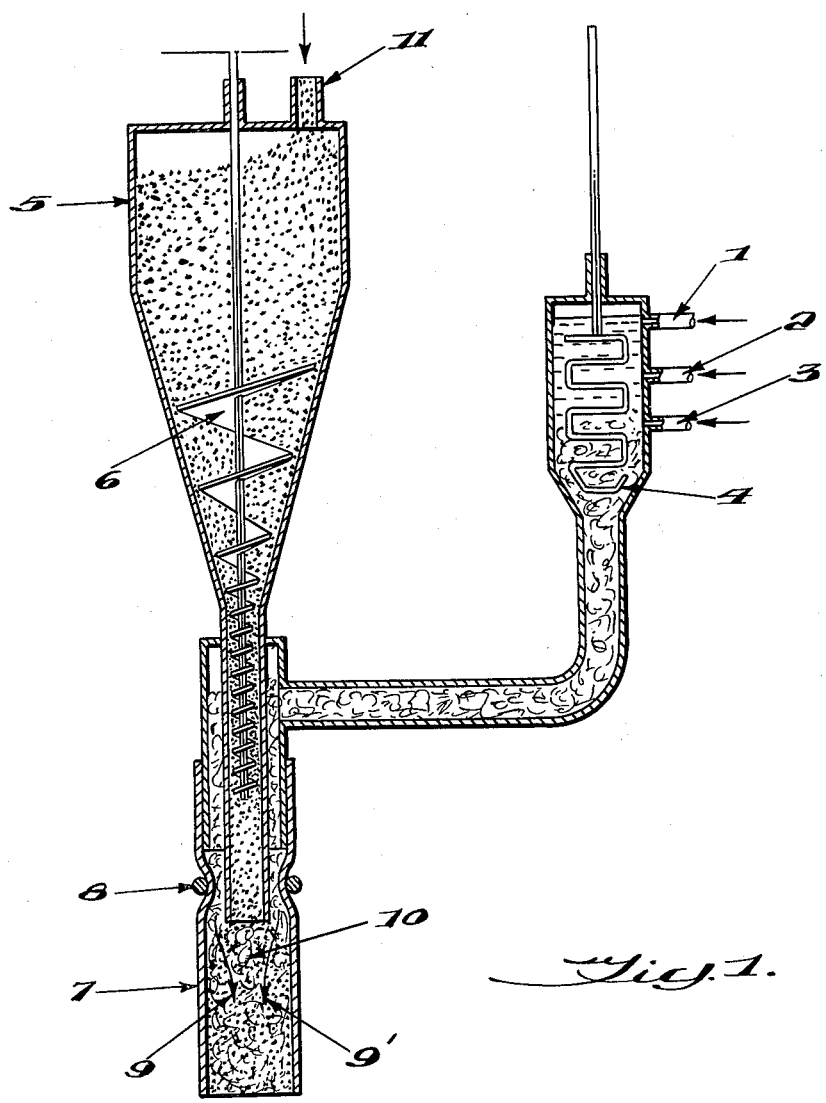

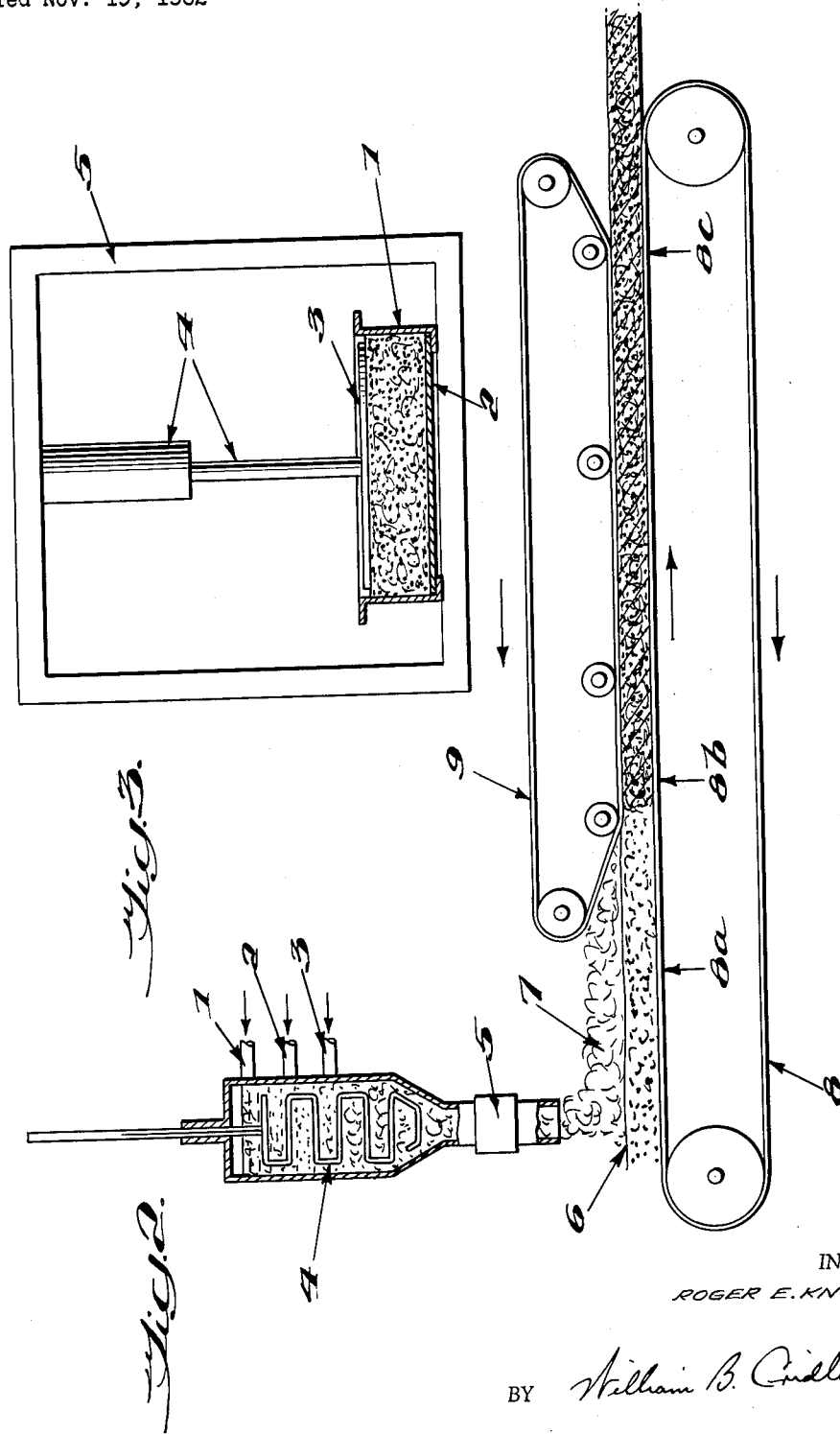

3,256,218
DISPERSING COARSE FILLERS IN POLY-
URETHANE FOAMS
Roger E. Knox, Claymont, Del., assignor to E. I. du Pont
de Nemours and Company, Wilmington, Del., a corporation of Delaware
Filed Nov. 19, 1962, Ser. No. 238,536
7 Claims. (Cl. 260—2.5)

This invention relates to tack-free cellular materials. More particularly this invention relates to a novel process for preparing tack-free polyurethane cellular materials containing a filler.

A wide variety of solid materials have been added to polyurethane foams to produce changes in properties for one reason or another. These solid materials, which can be described as fillers, include finely divided solid particles or powders, larger granular or particulate solids and fibrous materials. The most common procedure for the preparation of polyurethane foams which contain solid material added as a filler involves suspending the filler in a liquid polyurethane foam precursor. This procedure works reasonably well when the filler to be added is a fine powder of such dimensions that it will be incorporated into the network of the final polyurethane foam. However, when fillers having dimensions approaching the cell size of the foam or exceeding the cell size of the foam are to be added, the prior procedure of adding the fillers to a liquid polyurethane foam precursor is not satisfactory. There are several reasons why this procedure for adding fillers to polyurethane foam tends to be unsatisfactory with larger size fillers. First, if the specific gravity of a filler having large particle dimensions differs significantly from the specific gravity of the polyurethane foam precursor it will be difficult to make a uniform suspension of the filler in the liquid polyurethane foam precursor. Second, if one desires to make a polyurethane foam composition containing a large percentage of filler, the quantity of liquid polyurethane foam precursor relative to the volume of filler may be so small that it is difficult to wet the filler uniformly. If the desired proportion of filler is exceedingly high, the mixture of liquid polyurethane foam precursor and filler will consist of solid filler particles moistened unevenly by the liquid foam precursor. Third, if the filler is a porous material, such as shredded corn stalks, straw, wood chips or ground cork, it will have a tendency to absorb or "soak up" the liquid polyurethane foam precursor. This is undesirable because the polyurethane foam precursor absorbed by the filler is not readily available for the production of polyurethane foam later in the process. This results in higher density products and waste of the polyurethane foam precursor. In producing filled polyurethane foams containing a large proportion of filler, this problem can become quite serious. Fourth, many fillers which might be employed in polyurethane foams contains water unless special steps are taken for its removal. If a water-containing filler is mixed with a liquid polyurethane foam precursor containing isocyanato groups, the mixture must be used immediately for the production of foam, or premature reaction of the polyurethane foam precursor and the water in the filler may occur. Finally, if a liquid foam precursor is used as the transport medium in the continuous manufacture of filled foam, pumping and metering are virtually impossible with larger sizes of filler.

The need for an improved process for preparing polyurethane foams containing fillers of relatively large particle size has already been recognized. For example, it has been suggested that the liquid polyurethane foam precursor be sprayed onto the filler particles in an effort to get a more uniform distribution of the liquid foam precursor. However, this process does not prevent the liquid polyurethane foam precursor from being absorbed by the filler particles. Another process which has been suggested involves placing a layer of the liquid polyurethane foam precursor in the bottom of a mold, filling the mold with filler particles, closing the mold and foaming. In this process, the filler particles on the bottom of the mold contact the liquid foam precursor, while particles higher in the mold are contacted by foam at different stages of foam development. Obviously, with such a procedure, the distribution of polyurethane foam ingredients throughout the finished product will be nonuniform and the properties of the finished articles will vary throughout its volume.

It is an object of this invention to provide a novel process for the preparation of a tack-free polyurethane cellular material containing a filler having at least a particle size of approximately the same diameter as the average cell size of the cellular material. Another object is to provide a process for preparation of said filled cellular materials having said particles of filler uniformly dispersed throughout the final cellular materials. Other objects will appear hereinafter.

These and other objects are accomplished by a process for preparing a cured polyurethane cellular material containing a filler which process comprises contacting an expanded self-curable polyurethane froth with a filler and curing the resulting filled polyurethane cellular material. More particularly this process comprises contacting a filler with a self-curable polyurethane cellular material froth which has been formed by mixing under superatmospheric pressure a liquid self-curable polyurethane foam precursor with at least one inert fluid expanding agent and then expanding the mixture by pressure reduction and curing the polyurethane cellular material containing the filler; said filler consisting of particles having an average effective diameter of at least approximately the average effective diameter of the cells in the final cured product.

The essence of the present invention resides in producing a froth from a liquid self-curing polyurethane foam precursor and contacting the froth with the filler particles before any appreciable curing of the froth occurs. This process has a number of advantages that have been lacking in the processes previously available. By converting the liquid polyurethane foam precursor to a froth prior to contacting, the volume of material available for contacting the filler particles is increased at least several fold. This is especially important in producing foams containing a high proportion of filler. In addition, although froth is sufficiently mobile that contact between the froth and filler particles is not difficult to achieve, it does not wet the filler particles in the sense that a liquid foam precursor would. Thus the tendency of the filler particles to absorb or "soak-up" the foam precursor is markedly reduced. For the same reason, the ill effects caused by traces of water in the filler are reduced. Finally, the process of the present invention is readily operable. The products produced by this new process are quite uniform both in regard to the distribution of the solid filler particles throughout the foam and in regard to the distribution of the urethane foam ingredients throughout the volume of the product. In general, the products obtained by the process of this invention have a lower density for a given load-bearing capacity than products produced by processes disclosed in the prior art. This lowers the required amount of polyurethane foam precursor, which is generally more expensive than is the filler. As already indicated, the process of the present invention is particularly useful in preparing filled polyurethane foam containing a relatively large proportion of filler particles.

The liquid self-curable urethane foam precursors that may be used in the present process include any of the materials that are commonly used to prepare rigid or flexible foams by the "one-shot," prepolymer or semiprepolymer techniques. In general, these self-curable precursors are mixtures which contain one or more components bearing free isocyanato groups and one or more components containing hydroxyl and/or amine groups. In addition, these mixtures may include water to furnish part of the gas required for completing the expansion of the froth produced initially by vaporization of the inert fluid expanding agent. As is well known to those skilled in the art, such self-curable foam precursors containing hydroxyl and isocyanato groups must be used almost immediately after mixing. Generally, the foam precursors will also contain small amounts of catalysts to increase the rate of reaction of isocyanato groups with hydroxyl groups and water, and in addition, surfactants to improve the cell structure of the foam. Such agents are well known to those skilled in the art. They are described in a number of references including the following, "Rubber Chemistry and Technology," volume 33, pp. 1293–1392, 1960. The more useful self-curable polyurethane foam precursors include mixtures of polyester polyols and polyisocyanates, mixtures of polyalkyleneether polyols and polyisocyanates, mixtures of isocyanato-modified polyesters and polyols, mixtures of isocyanto-modified polyalkyleneether polyols and polyols, and mixtures of isocyanato-modified polyalkyleneether polyols containing an excess of free organic polyisocyanate and a polymeric polyol. The properties of the final foam are largely determined by the nature of the components empolyed in the self-curable polyurethane foam precursor. By using polyols which are at least tri-functional and which have a relatively low molecular weight (hydroxyl numbers of about 350–600) rigid foams may be produced. Conversely, the use of relatively high molecular weight polyols having two to three hydroxyl groups (hydroxyl numbers of about 40–120) leads to the production of flexible foams. The density of the foam produced is controlled mainly by the quantities of inert fluid expanding agents employed or by the amount of inert fluid expanding agent plus the amount of carbon dioxide employed, the latter being produced via the isocyanato-water reaction.

Polyalkyleneether polyols are the preferred polyols for preparing the self-curable urethane foam precursors. They are generally made by condensing alkylene oxides with low molecular weight aliphatic glycols or polyols such as ethylene glycol, 1,2-propylene glycol glycerine, 1,2,6-hexane triol, trimethylol propane, pentaerythritol and sorbitol. Condensation products of alkylene oxides with amino alcohols such as ethanolamine and with polyamines such as ethylene diamine and diethlene triamine can also be used. While a wide variety of arylene diisocyanates may be used to produce the self-curable urethane foam precursors, toluene-2,4-diisocyanate, toluene-2,6-diiocyanate, 1,3-phenylene diisocyanate and 4,4'-diisocyanatodiphenylmethane are especially preferred. They are available commercially. A mixture of toluene diisocyanate containing about 80 parts of toluene-2,4-diisocyanate and 20 parts of toluene-2,6-diisocyanate is expecially preferred either for use directly in self-curable urethane foam precursors or for use in the preparation of isocyanato-modified polyols which in turn are used in the self-curable urethane foam precursor. It is obvious, that future developments in isocyanate and polyurethane chemistry may lead to the introduction of starting materials other than those which are presently preferred.

The froth required for contacting with the filler can conveniently be made by several procedures. The froth can be prepared by the addition of at least one inert fluid expanding agent to the self-curable urethane foam precursor under superatmospheric pressure in a mixing chamber to insure proper dispersion of the expanding agent and precursor. Then the pressure is reduced (in a continuous operation the mixture flows continually from the mixer through a let-down valve to a reduce pressure) so that the fluid expanding agent is allowed to expand at least partially at a reduced pressure, generally atmospheric pressure, to form a froth. Ideally, the inert fluid expanding agent which is used to form the froth should be a gas at room temperature so that heating is not required for its vaporization. The term "inert" means the expanding agent will not react with the foam precursor. A variety of fluids which are gases at room temperature can be used including permanent gases such as air, nitrogen, neon, or carbon dioxide. If permanent gases are used, however, very high pressures are required to cause the gas to dissolve in the self-curable urethane foam precursor. As a result, it is generally desirable to use a gas which is readily condensed, a preferred example of which is dichlorodifluoromethane, boiling at −29.8° C. at one atmosphere. The expanding agent can be an inert gas such as air, neon, or carbon dioxide or the agent can to a normally gaseous compound which is liquified by superatmospheric pressure. Dichlorodifluoromethane and 1,2-dichlorotetrafluoroethane are examples of the latter type expanding agents. With readily liquified gases, only relatively moderate pressures need to be employed while the expanding agents and the self-curable urethane foam precursor are mixed and on pressure release, a froth of the self-curable urethane foam precursor will be formed. In preparing froths which are expanded by an inert permanent gas, it is possible to disperse the gas in the liquid self-curable urethane foam precursor by mechanical means without dissolving the gas in the foam precursor. In other words, the gas may be whipped into the liquid foam precursor with a high speed, high shear agitator. In this case, a froth is formed directly in the mixer by the action of the mixer itself. Better results are generally obtained if such a mixer is operated under a moderate pressure (less than 200 p.s.i.) so that a relatively dense froth is produced in the mixer under pressure and is expanded on being released from the mixer. When permanent gases are used as frothing agents, the following process is particularly useful. A large volume of an inert permanent gas, preferably air, is passed co-currently with the foam precursor through a series of perforated plates in a column at superatmospheric pressures ranging from about 50 to 200 p.s.i. At least a portion of the self-curable urethane foam precursor is converted to a froth which on exiting from the top of the column can be further expanded by pressure release. The froth produced from self-curable urethane foam precursors by any of the procedures suggested above may be contacted with fillers in several way which will be described hereinafter.

Contact of the froth with the filler must be brought about promptly after the froth has been formed. As previously indicated, liquid self-curing foam precursors have a short life before they gel and the same is true when these materials are converted to a froth. Freshly produced froth has a consistency somewhat similar to that of shaving lather or well-beaten egg-white. When froth is in this condition, it can be contacted with a filler in mixing equipment which folds the ingredients together or the froth may be squeezed into the interstices between filler particles if the quantity of filler to be employed is exceptionally high or if the filler is oriented or compacted into a loosely bound network or bat. If the froth is allowed to stand for even a period of a few minutes before it is contacted with the filler, it will become increasingly stiff so that contacting with the filler will be difficult or impossible to carry out. Therefore, it is imperative that contact between the froth and the filler particles be performed essentially immediately after mixing of the components in the self-curing urethane foam precursor has taken place.

The froths produced by any of the above-described procedures can be further expanded by several methods if it is so desired. Further expansion can be accomplished if in addition to the expanding agent employed for producing the froth, a second inert fluid expanding agent is added which will not expand until the temperature is increased. The temperature increase to produce vaporization of this second expanding agent is usually furnished by the heat of reaction generated by the self-curable urethane foam precursor. Heat to produce additional expansion may however be furnished from an external source. A mixture of dichlorodifluoromethane and trichloromonofluoromethane is preferred when it is desirable to further expand the froth first formed with an inert fluid expanding agent. Alternatively, it has been found that under closely controlled conditions of pressure and temperature, a single compound such as trichloromonofluoromethane may be partially expanded during pressure let-down, and the remainder of expansion will occur upon subsequent temperature increase. A further possibility involves incorporating water into the self-curable urethane foam precursor along with the fluid expanding agent which produces froth on pressure release. When water is used, additional isocyanate is required, and the carbon dioxide produced via the isocyanato-water reaction brings about further expansion of the froth. It is obvious that numerous combinations of the procedures suggested above are possible. It should be noted at this point that further expansion of the initial froth may not always be desired. This is especially true in producing relatively high density articles containing a large proportion of reinforcing filler particles which are designed for use in structural applications. In this case, the bulk of the final item often will reside in the filler particles and a dense, strong rigid foam having a final density of 15–20 lb./cu. ft. may be required to adequately bind the filler particles together. In the production of low density items where high strength is not required, such as in thermal insulation, further expansion of the initially produced froth is generally desired, for it is difficult to handle froth directly which is sufficiently low in density for such purposes. In general, froths having densities ranging from about 3 to 20 lb./cu. ft. are most easily prepared and contacted with the filler particles.

In producing froths for use in the present invention, it is preferable to use about 2 to 10 parts of dichlorodifluoromethane for every 100 parts of the liquid organic urethane foam precursor by weight. When other readily liquified gases or inert permanent gases are employed as expanding agents to produce froth, they should be used in amounts which are equimolar to the amounts of dichlorodifluoromethane suggested.

A wide variety of granular, particulate or fibrous fillers may be incorporated into polyurethane foam by the process of the present invention. As previously indicated, the dimensions of the fillers to be employed in the present invention should approach or exceed the dimensions of the average pore size of the foam involved. Powdered fillers or finely divided fillers such as clay, pigments, walnut shell flour, finely divided wood pulp and carbon black, having dimensions smaller than those of the average cell size of the urethane foams are not meant to be included among those fillers which are of use in the present process. These finely divided fillers are readily incorporated into urethane foams by means of prior art processes which involve suspending the filler in the liquid self-curing urethane foam precursor or a liquid which will eventually be employed in a self-curing urethane foam precursor. The average cell diameter for urethane foam can vary considerably, but in general will range from about 0.002 to 0.10 of an inch. Cell size can be determined by counting the number of cells per linear inch on a slice of foam placed under low power magnification. In actual practice, several slices taken along different axes of the sample should be subjected to counting and the results averaged.

Actually, the dimensions of the most useful fillers in the present invention will generally exceed by at least several fold, the size of the cells in the polyurethane foam. The quantity of filler to be employed can also vary widely. In order to better clarify the types and quantities of fillers which are useful in the present invention, several types of products which can be made by the present process will be described. These products find use in a variety of applications. Materials such as ground cork, expanded vermiculite, polystyrene beads and ground scrap rigid foam having particles ranging from about ⅛″ in diameter to ½″ in diameter may be incorporated into rigid foam in amounts such that about 10 to 75% of the volume of the final product is represented by filler. Rigid foam containing ground cork, vermiculite, polystyrene beads and scrap rigid foam all find use as insulating materials. Foams containing vermiculite evidence less tendency to burn. Since these fillers are usually cheaper than the urethane foam itself, finished products containing these fillers are less expensive to produce while still retaining most of the excellent insulation properties of pure polyurethane foam. Employing scrap rigid foam as a filler obviously eliminates or minimizes the waste associated with the manufacture of rigid foam products. Certain of these fillers also find use in flexible foams. For example, the addition of polystyrene beads or scrap rigid foam to flexible polyurethane foam in amounts ranging from about 30 to 50% by volume based on the volume of the final foam produces inexpensive structures which are still resilient at low deflection, but offer considerable resistance at higher deflection. These materials are of particular interest for the preparation of items such as crash pads and packing for delicate equipment during shipment. Surprisingly enough, these materials quickly return to their original dimensions after they have been compressed to half their normal thickness. The process of the present invention may also be employed to incorporate scrap flexible polyurethane foam which has been cut or ground to suitable dimensions of the order of ⅛″ to ½″ into fresh polyurethane flexible foam. From an economic standpoint, this application is quite important for it is well known that a certain amount of scrap material is produced in the production of flexible urethane foam.

Another group of fillers which are particularly useful in preparing products by the present process include cellulosic materials such as shredded corn stalks, bagasse (shredded sugar cane), straw, wood chips and wood shavings. These materials are usually incorporated into rigid foams to increase strength and lower costs. The dimensions of the fillers to be employed in this particular case may vary considerably. These fillers are irregular in size and shape and usually greater in size in one or two dimensions than in other dimensions. Pieces of this group of fillers ranging from about ¼″ up to about 3–5″ in length are in general most useful. Means by which such fillers can be contacted with froth will be described hereinafter. Using the present process, amounts of these fillers accounting from 10 to 80% of the final volume of the finished product can be produced. Such highly reinforced rigid foams are economical to produce because of the low cost of the fillers employed and have sufficient strength that they are useful as structural members. If elongated filler particles are used, they may be oriented so that the final reinforced foam will exhibit radically different properties when measured on different axes. Rigid foams containing a large proportion of oriented fibrous fillers begin to approach the properties of wood and may be used as wood substitutes for many applications. Even more highly oriented fillers may be conveniently introduced into urethane foam by the process of the present invention. These include such fillers as screens derived from wires or fibers, metal grill work, networks of wires or fibers, including glass fibers, and sheet metal reinforcing members. In general, such highly oriented fillers are incorporated into rigid foam to produce items which are useful as structural members. Certain of these fillers, such as screens and metal reinforcing members, may have a dimension equaling those of the structure containing them.

In carrying out the process of the present invention, froth is generally produced by contacting a self-curable polyurethane foam precursor and a fluid expanding agent in a high speed mixing head which is equipped with a pressure letdown valve so that the mixer can be operated at superatmospheric pressure and the contents of the mixer can be released through a letdown valve to produce froth. In operating this type of mixing equipment, it is customary to feed the required ingredients continuously to the mixing head and to release froth at the pressure letdown valve continuously. Batch-wise production of froth is rather inconvenient to perform. While the froth is most conveniently produced continuously, articles of relatively small dimensions can be made by the present process employing batch-wise mixing to contact continuously produced froth and filler particles. For example, filler particles may be placed in a suitable container, and froth produced continuously may be added until the correct amount has been supplied. The froth and filler particles in the container are then intimately contacted by immediately stirring rapidly by hand. To produce a relatively small molded item in which the proportion of filler is high, a mold can be filled with filler particles, a layer of froth of appropriate thickness placed on top of the filler and the lid of the mold placed on the froth so as to push the froth into the interstices which exist between the filler particles. Thus the froth and filler are completely contacted by forcing the froth throughout the filler. Ideally, this whole assembly should be compressed slightly by the lid of the mold while the foam cures. It is obvious in this latter case that further expansion of the froth after it has been forced into the mass of filler particles is not necessary and may be undesirable. This represents a case in which a second higher boiling fluid expanding agent or water generally need not be added to the mixture of self-curing urethane precursor and low boiling fluid expanding agent. However, it should be noted that a small amount of a secondary expanding agent guarantees excellent contact of filler and froth due to a minor amount of expansion once the mixture is in the mold.

Preferably, products made by the present process are produced continuously. Continuous operation is more economical, produces more uniform products and simplifies production of relatively large items which would be difficult to prepare batch-wise. Several types of equipment have been developed which can be used for preparing the products of this invention continuously. These are best illustrated by referring to FIGURES 1 and 2. FIGURE 1 illustrates equipment which is particularly useful for the introduction of granular fillers such as expanded vermiculite, ground cork, polystyrene beads and ground scrap rigid or flexible urethane foam. While this type equipment can be used with other fillers such as shredded corn stalks, straw or wood chips, glass or asbestos fiber, the length of such fibrous fillers must be reduced sufficiently so that the fillers will pass through the screw feeder which is employed in the equipment shown in FIGURE 1. The equipment shown in FIGURE 2 is most useful for preparing products containing large quantities of fillers such as shredded corn stalks, straw, wood chips, wood shavings and glass or asbestos fiber. With only minor modifications, the equipment illustrated by FIGURE 2 may be used to produce products containing oriented or continuous lengths of reinforcing members, FIGURES 1 and 2 are described in detail below.

With reference to FIGURE 1, a stream of isocyanato-containing material 1 and a stream of polyol 2, which optionally may contain water, are introduced into a high speed mixer 4 along with sufficient fluid expanding agent 3 to produce a froth of the desired density. The mixture of self-curable urethane foam precursor and fluid expanding agent enters the annulus formed by a larger section of pipe which surrounds the pipe forming the lower extension of screw feeder 6. A piece of flexible hose or tubing 7 is attached to the large diameter pipe and forms a sleeve which extends along and beyond the pipe forming the lower portion of the screw feeder. A screw hose clamp 8 for controlling pressure let-down is located just below the large pipe surrounding the lower portion of the screw feeder. By adjusting the hose clamp, the size of the annulus formed between the flexible hose and the pipe forming the lower end of the screw feeder may be varied. The size of this annulus should be adjusted so that premature vaporization of the fluid expanding agent does not occur before the mixture of foam precursor and fluid expanding agent passes the annulus. The size of the annulus should also be adjusted so that excessive pressure does not exist in the high speed foam precursor mixer or in the piping prior to the point of pressure let-down. The froth produced just beyond the annulus flows downward as indicated by arrows 9 and 9′, and contacts the filler particles, arrow labeled 10, which are supplied by the screw feeder 6. A supply of filler particles is maintained in the feed bin 5. These particles are carried by the helical agitator in the lower portion of the feeder and by adjusting the rate at which the agitator revolves, the quantity of filler supplied can be controlled. In most cases it is desirable to maintain a slight positive inert gas pressure (air or nitrogen) on the filler particle feed bin so that froth or froth components cannot enter the feed bin. For example, it has been found that if the apparatus is used without an inert gas that polystyrene beads will soften over an extended period of time due to the passage of some dichlorodifluoromethane back into the feed bin. Once the polystyrene beads begin to soften, they stick to one another and prevent proper feeding and may even jam the agitator in the screw feeder. With other fillers such as ground cork or expanded vermiculite, this problem is not as serious; however, it is usually desirable to maintain a positive pressure in the feed bin to prevent small quantities of froth from contacting the lower portion of the helical agitator in the screw feeder. The stream of mixed filler particles and froth issuing from the flexible hose on the bottom of the apparatus may be directed into suitable molds or onto a moving belt or may be used for void filling. Depending on whether or not a secondary inert fluid expanding agent or water has been added to the self-curable urethane foam precursor in addition to the primary inert fluid expanding agent, the mixture of froth and filler will either cure directly without further expansion or it may expand further prior to completion of curing. Curing of the self-curing urethane foam precursor may be accomplished at ambient temperature over a period of several days or may be hastened by employing external heat. Even without the use of external heat, however, most urethane foams will cure within a matter of minutes to such a degree that they are tack-free and may be handled without danger of deforming. Specific examples of the use of this equipment in preparing products by the process of this invention will be described hereinafter.

With reference to FIGURE 2, an isocyanate-containing stream 1, a polyol stream 2, and a stream of fluid expanding agent 3 are introduced into a high speed mixer 4, as previously described for FIGURE 1. The mixer is operated at superatmospheric pressure to prevent premature vaporization of the fluid expanding agent and the pressure existing in the high speed mixing head is controlled by the let-down valve 5 attached to the lower end of the mixer. The froth produced is discharged through the line extending below the let-down valve 5. The filler which is to be contacted by the froth is carried on an endless belt 8. The filler 6 is laid on the endless belt by means of a suitable spreading device where, it may be positioned randomly or more or less regularly. The filler may also be in the form of continuous members such as screens, networks or wires or endless sheet metal reinforcing members. On passing beneath the nozzle below let-down valve 5, a layer of froth 7 is laid down on the filler. Endless belt 9, which is driven so that its speed matches that of endless belt 8 then forces or presses the froth into the interstices that exist in the layer of filler. This takes place along that portion of endless belt 8 which is labeled 8A to 8B. The dimensions of the composite formed from froth and filler are controlled by means of belt 8 and belt 9. As shown in the diagram, no further expansion of froth takes place after the froth has been contacted with the filler. However, by tilting the horizontal portion of endless belt 9 upward, the space between belts 8 and 9 can be increased to allow for expansion of the foam prior to curing. In any case, dimensions of the final article are determined by the spacing which exists between endless belts 8 and 9. Belts 8 and 9 are sufficiently great in length that the urethane foam portion of the product will have cured to such a state by the time it reaches point 8C that the article will be dimensionally stable, tack-free and may be handled without fear of deformation. By means of minor modifications, the apparatus diagramed in FIGURE 2 can be adapted to produce a wide variety of cross sections which are particularly useful as structural members. For example, if belt 8 takes the form of a trough about 2 inches deep and 4 inches wide, one can produce a 2" x 4" structural member by filling the trough with straw or shredded corn stalks, contacting with urethane froth designed to yield a relatively high density rigid foam and allowing the composite to cure. The endless structural member produced can be cut to suitable lengths. If the filler particles are parallel to the length of the structure, the product simulates wood in that it has a grain and it can be nailed, sawed, drilled and planed with conventional wood-working tools.

Results comparable to those obtainable by the continuous equipment described in the preceding paragraph may be produced batch-wise by employing the equipment shown in cross-section in FIGURE 3. The filled foam is formed in a rectangular mold consisting of the elements labeled 1, 2 and 3. The walls of mold 1 are flanged on their lower edge, so that the bottom of the mold 2 may be removed to facilitate removal of the finished piece of foam. The lid of the mold 3 is movable and is attached to a hydraulic ram 4 by means of which the lid of the mold can be forced into the body of mold to compress the mold contents. The entire assembly of mold and hydraulic ram are held in position relative to one another by frame 5 which can be made of angle iron or steel I-beams.

The equipment of FIGURE 3 may be used either (a) by filling the cavity of the mold with a mixture of frothed foam precursor and the desired filler followed by the application of pressure to compress the mixture to the required density and dimensions or (b) by filling the mold cavity with filler, compressed or oriented as desired, and placing a layer of froth on top of the filler and finally forcing the froth into interstices of the filler by applying pressure with the lid of the mold. As in the case of the continuous equipment shown in FIGURE 2, a wide variety of products can be formed which can contain up to 80% filler.

When the equipment shown in FIGURES 2 and 3 is used, laminated products having a variety of facing materials attached to one or both sides may also be produced directly. In the case of the continuous equipment, the facing to be laminated would be fed onto endless belt 8 prior to placing the filler on the belt. If facing is desired on both sides of the filled foam, then a second sheet of facing material can be fed onto the layer of froth 7 before the entire sandwich assembly is contacted and compressed by endless belt 9. With the batch equipment shown in FIGURE 3, facing may be laminated to one side of the filled foam by placing a piece of facing of the proper dimensions in the bottom of the empty mold prior to introducing any ingredients. If facing is desired on both sides of the filled foam, an additional piece of facing should be placed on top of the mold after the mold is loaded but prior to applying pressure with the lid of the mold.

A wide variety of facing materials may be employed including plastics, sheet metal, heavy paper and wood. Decorative effects may be produced this way as well as structural members of increased strength. It is obvious that different types of facing can be employed on the same piece of foam or facing is applied to both sides of a piece of filled foam. Laminated articles may also be produced from filled foam by adhering the facing material to cured filled foam by means of adhesives.

A particularly useful panel structure of high strength can be produced if 3 or more thin sheets of wood, such as used for fabrication of plywood, are laminated and held together by layers of filled foam. The final structure, with the wood sheets running cross-grain, resembles plywood in which the adhesive normally used to hold the sheets together has been replaced with filled foam. By varying the thickness and number of wood sheets and/or foam layers, the density of the foam and the type and amount of filler in the foam, a wide variety of products can be obtained.

The process of the present invention is not meant to be restricted to the equipment described above and diagramed in FIGURES 1, 2 and 3. For example, froth and filler can be fed into a continuous mixer having a horizontal helical agitator and the mixture produced discharged into a mold or onto a belt where it can be shaped. Likewise, with certain types of fillers, contact between the froth and filler can be performed in an agitated pipeline mixer and the composite discharged into voids, molds or onto moving belts.

The following examples will better illustrate the nature of the present invention; however, the invention is not intended to be limited to these examples. Parts are by weight unless otherwise indicated.

*Example 1*

A rigid foam formulation is prepared by bringing three streams together simultaneously in a high-speed mixing head. The ingredients employed and their proportions in parts by weight are listed below.

Stream 1:
  A polypropylene ether triol having a number-average molecular weight of about 285; made by reacting about 2.6 moles of propylene oxide with 1 mole of 1,1,1-trimethylolpropane __ 30.1
  A polydimethylsiloxane-polyalkyleneether block copolymer (made in accordance with the procedure of Example I(a) of U.S. 2,834,748) __ 1.0
  Triethylenediamine _____ 0.3
  Fluorotrichloromethane _____ 25.0

Stream 2:
  Polyisocyanate composition having a free isocyanato group content of about 28% by weight; made by reacting about 5.5 moles of a toluene diisocyanate isomer mixture (80% 2,4-; 20% 2,6-) with 1 mole of the polypropylene ether triol employed in stream 1 above _____ 53.0

Stream 3: Difluorodichloromethane _____ 5.0

Equipment which is suitable for metering and mixing these three streams is described in Du Pont Elastomer Chemicals Bulletin HR-32, "Metering and Mixing Equipment for the Production of Urethane Foam Products," by S. A. Stewart, E. I. du Pont de Nemours and Company (Inc.), Wilmington, Delaware, September 1958, and in "Chemical Engineering Progress," volume 57, October 1961, pages 40-46.

The equipment shown in FIGURE 1 and described in the specification is employed to produce filled foam from the rigid foam formulation described above. The feed bin for filler particles is loaded with expanded polystyrene beads having a bulk density of 0.7 lb./cu. ft. and diameters ranging from about 1/8" to 5/8". The screw feeder is operated at a rate such that the weight of beads fed is about equal to the combined weight of polypropylene ether triol and polyisocyanate composition being fed to the high-speed mixing head. A stream of nitrogen is introduced into the feed bin to prevent vapors of the fluid expanding agents from entering the bin. Screw hose clamp 8 is adjusted so that the pressure in the system prior to let-down is about 60 p.s.i.g. As the foam formulation passes by the screw hose clamp, the difluorodichloromethane in the formulation vaporizes to produce a froth of self-curing rigid polyurethane foam precursor which has a density of about 6 lb./cu. ft. This froth contacts the polystyrene beads entering from the screw feeder and the two materials are mixed by turbulence in the flexible hose 7 which extends below the screw feeder. The mixture issuing from flexible hose 7 is directed into a mold where it is allowed to complete its expansion due to volatilization of the fluorotrichloromethane. It is cured by heating in an oven at 120° C. for 1 hour. The final filled foam contains polystyrene beads uniformly dispersed throughout. The cell diameters of the urethane foam binder is 0.004–0.012 inch.

In a similar fashion, a variety of other fillers are added to the rigid foam formulation described above in amounts about equal to the combined weight of polyol plus polyisocyanate composition. These include coarse sawdust, cork granules, chopped scrap rigid urethane foam, granules of expanded vermiculite, and polystyrene beads having a bulk density of 1.5 lb./cu. ft.

*Example 2*

A rigid foam formulation is prepared as described in Example 1 with the exception that 15 parts of fluorotrichloromethane is used in Stream 1 and 4 parts of difluorodichloromethane is used as Stream 3. Froth is produced continuously in a mixing head fitted with a pressure let-down valve. The mixing head is operated at a pressure of about 60 p.s.i.g. The froth is mixed with shredded cornstalk chips about one to two inches in length and ¼ to ½ inch in width as a filler in amounts ranging from 10 to 85% by weight of the total weight of froth plus filler. The froth has a density of about 6–9 lb./cu. ft. before mixing with the filler. The mixture of froth and filler is placed in the mold shown in FIGURE 3 and compressed at a pressure of about 5 to 20 lb./sq. in. and allowed to cure while under pressure. The molded filled foams produced vary in density from 5 to 40 lb./cu. ft. depending on the amount of shredded cornstalk added and the pressure applied in the mold. The density of the froth employed may be varied by increasing or decreasing the amount of difluorodichloromethane employed in the formulation.

The products produced are useful as wood substitutes for certain applications. They may be nailed, drilled or cut with a saw. Their strength versus unfilled foam produced from the same froth is indicated by the data presented in the following table:

| Wt. Percent Foam Binder | Wt. Percent Shredded Corn Stalks | Density of Filled Foam, lb./cu. ft. | Bending Modulus, p.s.i. | Compressive Strength, p.s.i. |
| --- | --- | --- | --- | --- |
| 40 | 60 | 23 | 15,430 | 517 |
| 50 | 50 | 24 | 52,500 | 354 |
| 100 | -------- | 9 | 5,100 | 202 |

Following the above procedure, filled foams are produced using hay, straw, waste rigid foam, wood splinters, wood chips, shredded sugar cane (bagasse), glass fibers and asbestos fibers.

*Example 3*

Filled foams are produced as described in Example 2 containing the same size of shredded cornstalk chips as the filler with the exception that a "one-shot" foaming system is employed in place of the "prepolymer" system employed in Example 2 and the second expanding agent, fluorotrichloromethane, is omitted. The formulation to produce the froth is prepared by bringing three streams together simultaneously in a high-speed mixing head fitted with a let-down valve. The mixer is operated at a pressure of about 60 p.s.i.g. The froth is produced and contacted with the filler as the urethane foam precursor issues from the let-down valve. The ingredients employed and their parts by weight proportions in the three streams fed to the precursor mixing head are listed below.

Stream 1:
  A polypropylene ether hexol having a number-average molecular weight of about 750 produced by reacting 1 part of sorbitol with about 3.1 parts of propylene oxide _____ 100.0
  A polydimethylsiloxane-polyalkyleneether block copolymer _____ 3.0
  Stannous 2-ethylhexanoate _____ 0.5
  Triethylenediamine _____ 0.1
Stream 2: A toluene diisocyanate isomer mixture (80% 2,4-; 20% 2,6-) _____ 77.0
Stream 3: Difluorodichloromethane _____ 10.0

Once the mixture of ingredients leaves the mixing head in this case, expansion is nearly complete. This "one-shot" formulation is particularly useful in producing relatively dense filled foams for use as structural members. It is also well suited for use with the equipment shown in FIGURES 2 and 3.

*Example 4*

A flexible foam formulation is prepared by bringing four streams together simultaneously in a high-speed mixing head at about 60 p.s.i.g. The ingredients employed and their proportions in parts by weight are listed below:

Stream 1:
  A polypropylene ether triol having a number average molecular weight of about 3000; prepared by reacting 1 part of glycerine with about 31.6 parts of propylene oxide _____ 95.0
  A polydimethylsiloxane-polyalkyleneether block copolymer (made in accordance with the procedure of Example 1(a) of U.S. 2,834,748) ___ 1.0
  Water _____ 3.2
  Triethylenediamine _____ 0.2
Stream 2: A toluene diisocyanate isomer mixture (80% 2,4-; 20% 2,6-) _____ 40.0
Stream 3:
  Polypropylene ether triol used in Stream 1 _____ 5.0
  Stannous 2-ethylhexanoate _____ 0.4
Stream 4: Difluorodichloromethane _____ 6.0

The equipment shown in FIGURE 1, modified for four inlets in mixer number 4, is employed to produce filled foam from the above formulation which yields a froth density of 7 lb./cu. ft. due to expansion of difluorodichloromethane at the point of let-down. With polystyrene beads having a bulk density of 2 lb./cu. ft. and a diameter of about ⅛ to ¼ inch, a filled foam containing about 50% by volume polystyrene beads is produced which has an overall density of 2.2 lb./cu. ft. This material can be compressed to about 50% of its original thickness with little more force than that required to compress a sample of unfilled foam made from the same formulation; however, it offers considerable resistance to further compression. This filled foam is useful as a crash pad material. A filled foam having similar properties is produced by the same procedure, but using chopped rigid urethane foam as the filler. When chopped flexible urethane foam is used in place of chopped rigid urethane foam the final foam containing about 50% by volume of filler has essentially the same properties of a conventional non-filled flexible foam. This material represents a useful outlet for scrap flexible foam.

Example 5

The flexible foam formulation described in Example 4 is used to produce a froth using conventional mixing equipment. The froth is then mixed by hand with straw, which has been cut into two inch lengths, and placed in the mold shown in FIGURE 3. The mixture is compressed and allowed to cure while being compressed and finally removed from the mold. The filled foam containing about 70% by volume of straw is relatively flexible, but of sufficient strength that it can be used as a wall panel. It has excellent sound and vibration dampening characteristics. When this material is laminated directly to a piece of clear vinyl plastic sheet, a material which is useful as floor tile is produced. The floor tile is yielding to the step and is attractive in appearance.

In a similar manner, filled foam is produced in which hay is used as the filler. The characteristics of this latter material are quite similar to those of the filled foam produced from straw.

As many widely different embodiments of this invention may be made without departing from the spirit and scope thereof, it is to be understood that this invention is not limited to the specific embodiments thereof except as defined in the appended claims.

What is claimed is:

1. In a procss for preparing a cured cellular polyurethane material containing coarse filler of at least about ⅛ inch effective diameter wherein a mixture of a self-curable polyurethane foam precursor is mixed with an inert fluid expanding agent maintained under super-atmospheric pressure which mixture upon pressure reduction forms a froth, the improvement wherein uniform dispersion of said coarse filler is obtained which consists in contacting and intimately dispersing said filler with said precursor promptly after said froth has been formed and curing said froth-containing filler to a tack-free cellular material.

2. A process as described in claim 1 wherein said filler is polystyrene.
3. A process as described in claim 1 wherein said filler is granular polyurethane foam.
4. A process as described in claim 1 wherein said filler is a cellulosic material.
5. A process as described in claim 1 wherein said filler is shredded cornstalks.
6. A process as described in claim 1 wherein said filler is wood.
7. A process as described in claim 1 wherein said filler is straw.

References Cited by the Examiner

UNITED STATES PATENTS

| | | | |
|---|---|---|---|
| 3,015,634 | 1/1962 | Ferringo | 260—2.5 |
| 3,052,927 | 9/1962 | Hoppe et al. | 260—2.5 |
| 3,136,732 | 6/1964 | Kaestner et al. | 260—37 XR |
| 3,148,162 | 9/1964 | Gmitter et al. | 260—2.5 |

FOREIGN PATENTS 822,546  10/1959  Great Britain.

OTHER REFERENCES

Kunstoffe: Vol. 42, December 1952, pp. 450–459.

LEON J. BERCOVITZ, *Primary Examiner.*

DONALD E. CZAJA, *Examiner.*

J. J. KLOCKO, *Assistant Examiner.*